(12) United States Patent
Lim et al.

(10) Patent No.: US 8,135,039 B2
(45) Date of Patent: Mar. 13, 2012

(54) METHOD AND APPARATUS FOR ALLOCATING RADIO RESOURCE IN COMMUNICATION SYSTEM

(75) Inventors: Kwang-Jae Lim, Daejeon (KR); Chul-Sik Yoon, Seoul (KR); Jee-Hwan Ahn, Daejeon (KR)

(73) Assignees: Samsung Electronics Co., Ltd., Suwon-si (KR); Electronics and Telecommunications Research Institute, Daejeon (KR)

( * ) Notice: Subject to any disclaimer, the term of this patent is extended or adjusted under 35 U.S.C. 154(b) by 477 days.

(21) Appl. No.: 12/307,743

(22) PCT Filed: Jul. 6, 2007

(86) PCT No.: PCT/KR2007/003280
§ 371 (c)(1),
(2), (4) Date: Jan. 6, 2009

(87) PCT Pub. No.: WO2008/004831
PCT Pub. Date: Jan. 10, 2008

(65) Prior Publication Data
US 2009/0239546 A1    Sep. 24, 2009

(30) Foreign Application Priority Data

Jul. 7, 2006 (KR) .................. 10-2006-0063836
Feb. 2, 2007 (KR) .................. 10-2007-0011013

(51) Int. Cl.
*H04J 4/00* (2006.01)
*H04B 1/00* (2006.01)
(52) U.S. Cl. .......... 370/476; 370/329; 455/72; 455/450; 455/509

(58) Field of Classification Search .................. 370/476, 370/329; 455/72, 450, 509
See application file for complete search history.

(56) References Cited

U.S. PATENT DOCUMENTS

| 6,895,248 | B1 | 5/2005 | Akyol et al. | |
|---|---|---|---|---|
| 2005/0068884 | A1 | 3/2005 | Yoon et al. | |
| 2005/0288030 | A1 | 12/2005 | Choi et al. | |
| 2006/0039274 | A1 | 2/2006 | Park et al. | |
| 2006/0268714 | A1 * | 11/2006 | Szczepanek et al. | 370/235 |
| 2008/0192676 | A1 * | 8/2008 | Mantha | 370/320 |

FOREIGN PATENT DOCUMENTS

WO    2005065056 A2    7/2005

OTHER PUBLICATIONS

3GPP TSG-RAN WG1 #44, Feb. 13-17, 2006, R1-060573; "E-UTRA Downlink Control Signaling—Overhead Assessment".*
IEEE, Part 16: Air Interface for Fixed and Mobile Broadband Wireless Access Systems/Amendment 2: Physical and Medium Access Control Layers for Combined Fixed and Mobile Operation in Licensed Bands and Corrigendum 1, IEEE Std 802.16e—2005 and IEE Std 802.16—2004/Cor1-2005, Feb. 28, 2006, New York, NY.

* cited by examiner

*Primary Examiner* — Barry Taylor
(74) *Attorney, Agent, or Firm* — Jefferson IP Law, LLP

(57) ABSTRACT

To transmit resource allocation information on a plurality of radio resources to a terminal, a resource allocation device expresses a radio resource that is differently allocated from before the resource allocation information is transmitted among the plurality of radio resources in a radio resource pattern sequence, generates resource allocation information on the plurality of radio resources based on the radio resource pattern sequence, and transmits the radio resource pattern sequence and the resource allocation information, or a compressed pattern sequence corresponding to the radio resource pattern sequence and the resource allocation information, to the terminal through a frame.

8 Claims, 8 Drawing Sheets

[Fig. 1]
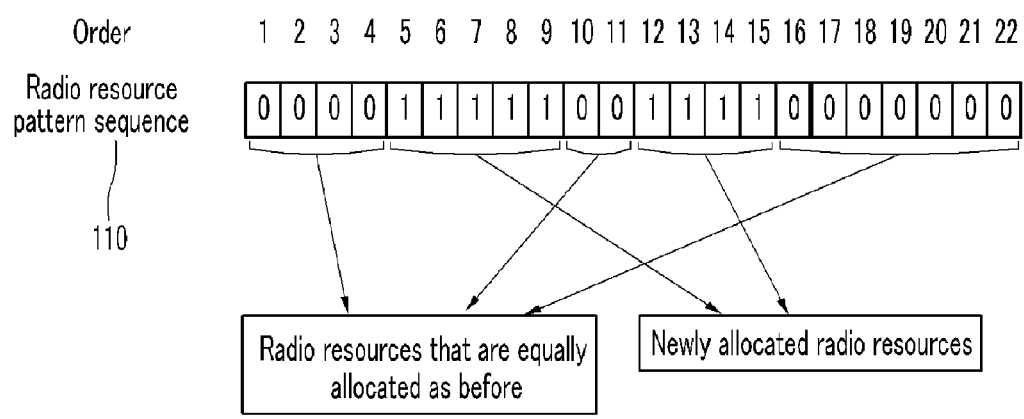

[Fig. 2]
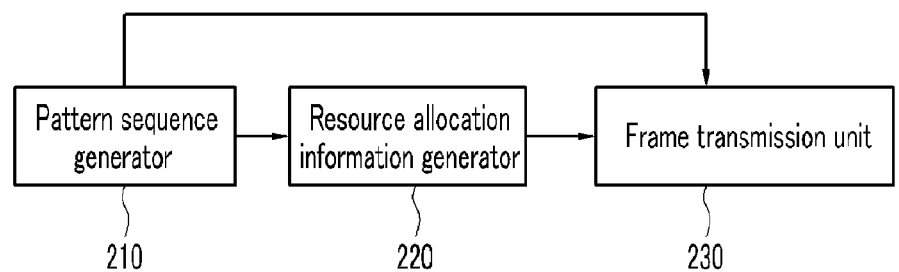

[Fig. 3]
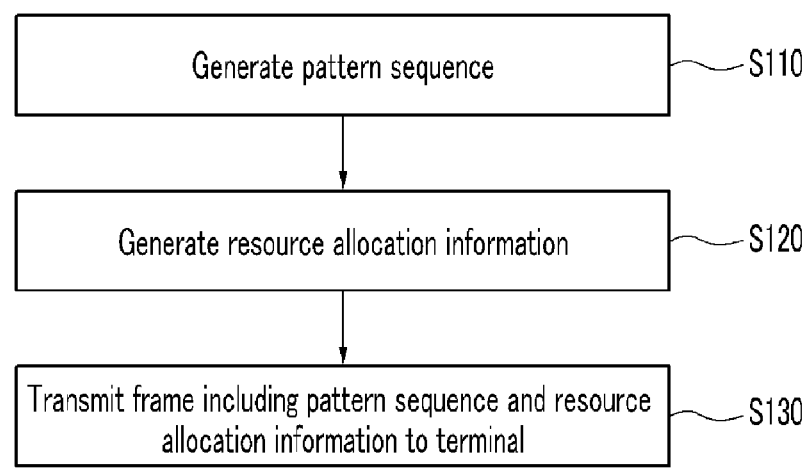

[Fig. 4]
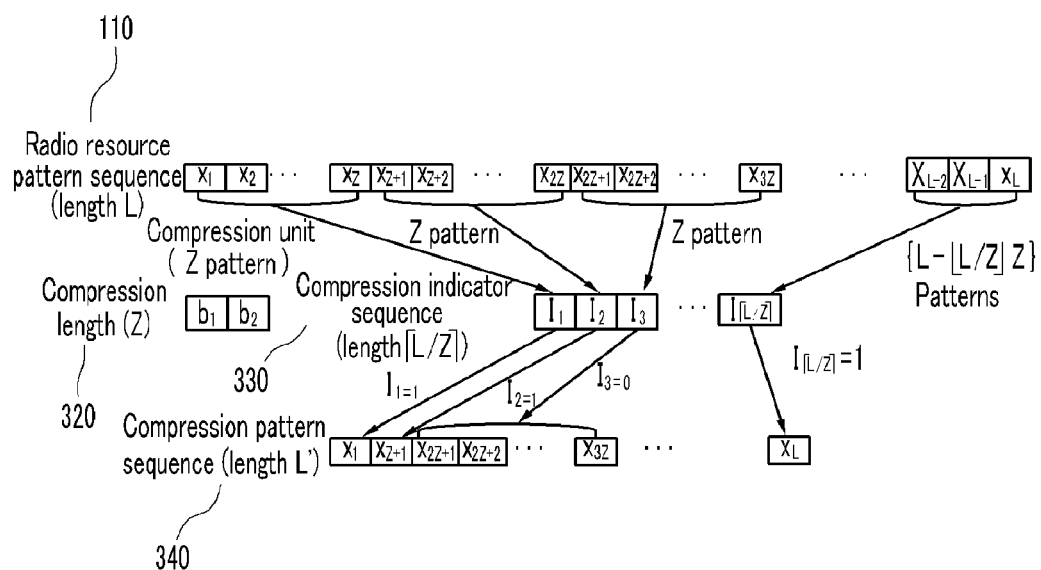

[Fig. 5]
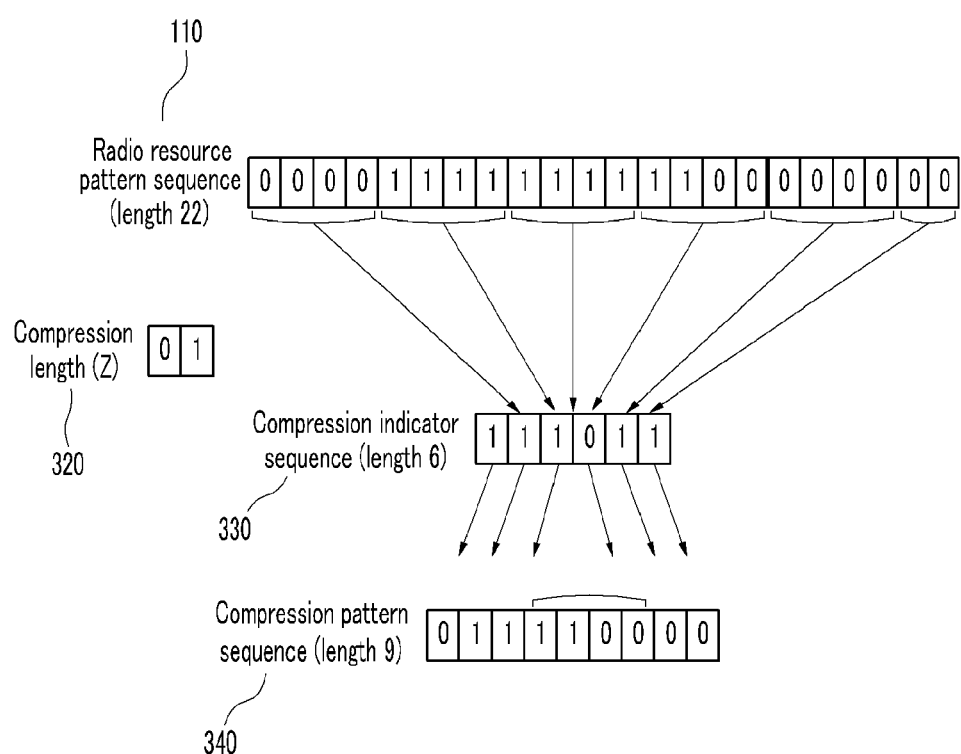

[Fig. 6]
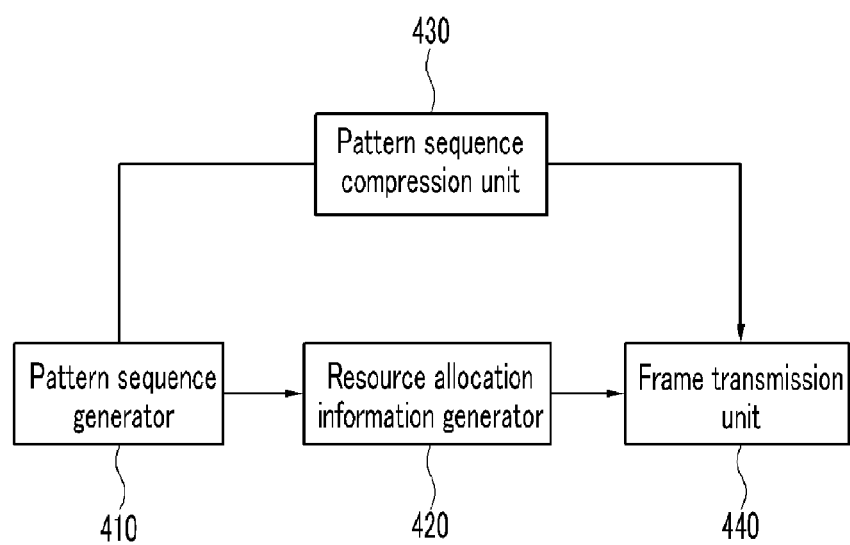

[Fig. 7]
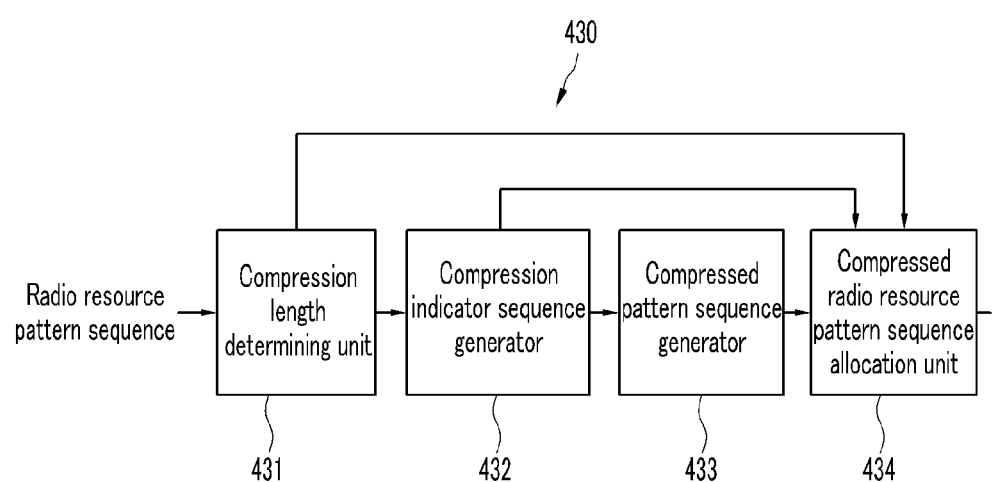

[Fig. 8]
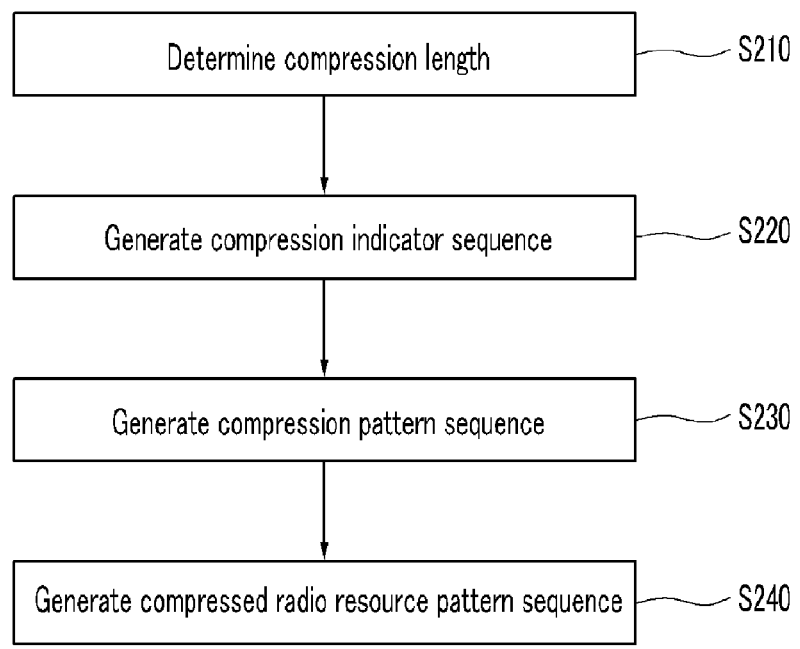

METHOD AND APPARATUS FOR ALLOCATING RADIO RESOURCE IN COMMUNICATION SYSTEM

TECHNICAL FIELD

The present invention relates to a resource allocation method and device in a communication system.

BACKGROUND ART

A base station of a communication system uses a map transmitted for each frame through a downlink to allocate radio resources to a terminal. When informing various terminals of the allocated radio resources, a run-length method is used. In the run-length method, while a starting point of the allocated radio resource is not informed, sizes of the resources allocated to each terminal are informed, and the starting point of the resources allocated to each terminal is informed based on a sum of the sizes of the resources.

However, in a service having predetermined traffic such as a real-time service or a voice service, since the radio resources are required to be allocated for each frame again when it is required to allocate the fixed radio resources, there is a problem in that a signaling overhead for an allocation message is high.

In addition, when a method for fixedly allocating the radio resources by using one allocation message without allocating the radio resources to the terminal for each frame is used while using the run-length method, it is required to acknowledge all the fixedly allocated radio resources to detect a location of the allocated radio resources.

However, the map in a previous frame may not be detected by an error, and the location of the radio resources allocated to the terminal may be falsely acknowledged when the run-length method is used.

The above information disclosed in this Background section is only for enhancement of understanding of the background of the invention and therefore it may contain information that does not form the prior art that is already known in this country to a person of ordinary skill in the art.

DISCLOSURE OF INVENTION

Technical Problem

The present invention has been made in an effort to provide a method for allocating a radio resource with less overhead and without being affected by a receiving error of a previous map.

Technical Solution

In an exemplary method for transmitting resource allocation information on a plurality of radio resources to a terminal according to an embodiment of the present invention, the radio resource that is allocated differently from before the resource allocation information is transmitted among the plurality of radio resources is expressed on a first pattern sequence, resource allocation information on the plurality of radio resources is generated based on the first pattern sequence, and a second pattern sequence corresponding to the first pattern sequence and the resource allocation information are transmitted to the terminal.

In an exemplary method for transmitting a downlink frame to a terminal according to an embodiment of the present invention, a radio resource that is differently allocated from a previous frame is expressed on a pattern sequence among a plurality of radio resources, resource allocation information on the plurality of radio resources in the downlink frame is generated, the downlink frame including the pattern sequence, and the resource allocation information is transmitted to the terminal. The resource allocation information is generated based on the pattern sequence.

In an exemplary method for informing a terminal of radio resource allocation by using a pattern sequence including a plurality of radio resources, a compression unit length is determined, the pattern sequence is divided into a plurality of compression units based on the compression unit length, a compression possibility for the plurality of compression units is determined, and the compression possibility is expressed in a compression indicator sequence.

BRIEF DESCRIPTION OF THE DRAWINGS

FIG. 1 is a diagram representing a radio resource pattern sequence according to an exemplary embodiment of the present invention.

FIG. 2 is a block diagram representing a resource allocation device according to a first exemplary embodiment of the present invention.

FIG. 3 is a flowchart representing a resource allocation method according to the first exemplary embodiment of the present invention.

FIG. 4 is a diagram representing a method for compressing the radio resource pattern sequence according to the exemplary embodiment of the present invention.

FIG. 5 is a diagram representing the radio resource pattern sequence compressed by using the compressing method shown in FIG. 4.

FIG. 6 is a diagram representing the resource allocation device according to a second exemplary embodiment of the present invention.

FIG. 7 is a flowchart representing a pattern sequence compression unit for compressing the radio resource pattern sequence according to the exemplary embodiment of the present invention.

FIG. 8 is a flowchart representing a method for compressing the radio resource pattern sequence according to the exemplary embodiment of the present invention.

MODE FOR THE INVENTION

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Unless explicitly described to the contrary, the word "comprise" will be understood to imply the inclusion of stated elements but not the exclusion of any other elements. In addition, the word "unit" will be understood to process a predetermined function or operation, which may be realized by hardware, software, or a combination thereof.

A resource allocation method and device using a compressed pattern sequence in a communication system according to an exemplary embodiment of the present invention will be described with reference to the figures.

Firstly, the resource allocation method and device of the communication system according to a first exemplary embodiment of the present invention will be described with reference to FIG. 1 to FIG. 3.

FIG. 1 is a diagram representing the radio resource pattern sequence according to the exemplary embodiment of the present invention.

As shown in FIG. 1, a length of the radio resource pattern sequence 110 used by a base station to inform a terminal of a new radio resource is 22, which is the same as the number of radio resources, the radio resources newly allocated in a current frame are expressed as 1 (otherwise, 0), and the radio resources that are not newly allocated are expressed as 0 (otherwise, 1). Here, the previously allocated radio resources expressed as 0 are used to perform a fixed allocation in a previous frame or are not used for any other purpose.

The terminal may perform the fixed allocation through the radio resource pattern sequence and may acknowledge unallocated radio resources in a map of a current frame regardless of reception of a previous map. Accordingly, since the terminal may acknowledge a location based on the radios resources allocated in the current map when the base station uses the run-length method or another pattern sequence method to inform the terminal of the location of the radio resource, the base station may precisely inform the terminal of the location of the allocated radio resource.

FIG. 2 is a block diagram representing a resource allocation device according to a first exemplary embodiment of the present invention, and FIG. 3 is a flowchart representing the resource allocation method according to the first exemplary embodiment of the present invention.

As shown in FIG. 2, the resource allocation device includes a pattern sequence generator 210, a resource allocation information generator 220, and a frame transmission unit 230.

Referring to FIG. 2 and FIG. 3, in step S110, the pattern sequence generator 210 generates the radio resource pattern sequence 110 for identifying a reserved resource that is fixedly allocated or is not used in a previous frame and a radio resource that is newly allocated in a current frame among radio resources allocated to the terminal.

In step S120, the resource allocation information generator 220 generates resource allocation information on the radio resources that are newly allocated in the current frame, based on the radio resource pattern sequence 110 generated by the pattern sequence generator 210. In addition, the resource allocation information generator 220 may generate the resource allocation information including a size of the radio resource allocated to each terminal. In this case, the terminal may detect the radio resources allocated to the terminal by a value obtained by sequentially adding the sizes of the radio resources allocated to the respective terminals based on the radio resource pattern sequence 110.

The frame transmission unit 230 transmits a frame including the radio resource pattern sequence 110 and the resource allocation information to the terminal in step S130.

In addition, since the radio resources may be easily canceled or newly allocated, the same pattern may be sequentially repeated in the radio resource pattern sequence 110.

Accordingly, a method for compressing the radio resource pattern sequence shown in FIG. 1 will now be described with reference to FIG. 4 and FIG. 5.

FIG. 4 is a diagram representing the method for compressing the radio resource pattern sequence according to the exemplary embodiment of the present invention, and FIG. 5 is a diagram representing the radio resource pattern sequence compressed by using the compressing method shown in FIG. 4.

As shown in FIG. 4, when the radio resources are allocated through a radio resource pattern sequence 310 including L radio resources, the radio resource pattern sequence 310 has L patterns. When a bit length indicating the respective pattern is P, a bit length of the entire pattern sequence is L*P.

In the compressed pattern sequence method, an original pattern sequence that is not compressed includes three sequences including a compression length, a compression indicator sequence, and a compressed pattern sequence.

A compression length 320 indicates a number Z of patterns in a group when a plurality of patterns are grouped to compress the patterns. For example, the compression length 320 is 2 bits, 00 indicates that no pattern is compressed (Z=0), 01 indicates one group of 4 patterns (Z=4), 10 indicates one group of 6 patterns (Z=6), and 11 indicates one group of 8 patterns (Z=8). When Z patterns are grouped as one group, $$\lfloor L/Z \rfloor$$

groups are included in the pattern sequence having the length L. The respective groups include the Z patterns except for a last group, and the last group includes $$(L - Z \lfloor L/Z \rfloor)$$

patterns.

In addition, when the compression length 320 is expressed as 1 bit, the compression length 320 indicates whether the compressed pattern is used. For example, when the compression length is 1 (or 0), it indicates that the compressed pattern is used, and when the compression length is 0 (or 1), it indicates that the compressed pattern is not used.

A compression indicator sequence 330 includes $$\lfloor L/Z \rfloor$$

bits, and the respective bits of the compression indicator sequence 330 indicate a compression state of a corresponding group. For example, $I_i=1$ when an $i^{th}$ a group is compressed, and $I_i=0$ when the $i^{th}$ group is not compressed.

A compressed pattern sequence 340 expresses a pattern of each group according to the compression indicator sequence 330. When it is expressed in the compression indicator sequence 330 that a group is compressed (i.e., $I_i=1$), the corresponding group has the same patterns, and the same pattern is used in the compressed pattern sequence 340. When it is expressed in the compression indicator sequence 330 that a group is not compressed (i.e., $I_i=0$), the corresponding group has different patterns, and the group expresses Z patterns in the compressed pattern sequence 340.

In the compressed pattern sequence, patterns that are repeated in the pattern sequence including sequentially repeated patterns are compressed.

A method for allocating the radio resources from the base station to the terminal by using the compressed pattern sequence method will now be described with reference to FIG. 5. Since each pattern of the radio resource pattern sequence 310 is expressed as one bit (P=1) and the compression length 320 is 01, 4 patterns are grouped as one group. When the original radio resource pattern sequence 310 are grouped as five groups respectively including 4 patterns, the same pattern is repeated in first, second, third, fifth, and sixth groups. Accordingly, the compression indicator sequence 330 is expressed as 5 bits, first, second, third, fifth, and sixth bits are expressed as 1 to indicate that the pattern is compressed, and a fourth bit is expressed as 0 to indicate that the pattern is not compressed. In the compressed pattern sequence 340, the first group is expressed by one pattern 0 since it has a pattern in which 0 is repeated, and the second and third groups are expressed by one pattern 1 since they have patterns in which 1 is repeated. Since the same pattern is not repeated in the fourth group, the original pattern is expressed. Since the fifth and sixth groups have patterns of 0, it is expressed by the pattern 0 so as to indicate that the pattern is compressed.

Accordingly, the radio resource pattern sequence 310 that has been conventionally formed by 22 bits may be expressed by the 2-bit compression length 320, the 6-bit compression indicator sequence 330, and the 9-bit compressed pattern sequence 340, so that 5 bits (22−(2+6+9)) may be reduced in the pattern sequence.

The resource allocation device according to a second exemplary embodiment of the present invention will be described with reference to FIG. 6.

FIG. 6 is a diagram representing the resource allocation device according to the second exemplary embodiment of the present invention.

As shown in FIG. 6, the resource allocation device according to the second exemplary embodiment of the present invention includes a pattern sequence generator 410, a resource allocation information generator 420, a pattern sequence compression unit 430, and a frame transmission unit 440.

The pattern sequence generator 410 shown in FIG. 6 corresponds to the pattern sequence generator 210 shown in FIG. 2, and the resource allocation information generator 420 shown in FIG. 6 corresponds to the resource allocation information generator 220 shown in FIG. 2.

The pattern sequence compression unit 430 compresses the radio resource pattern sequence 110 shown in FIG. 1 to generate the compressed pattern sequence. In addition, the frame transmission unit 440 transmits the compressed pattern sequence generated by the pattern sequence compression unit 430 and the resource allocation information generated by the resource allocation information generator 420.

A method for compressing the radio resource pattern sequence by the pattern sequence compression unit 430 according to the exemplary embodiment of the present invention will be described with reference to FIG. 7 and FIG. 8.

FIG. 7 is a flowchart representing the pattern sequence compression unit for compressing the radio resource pattern sequence according to the exemplary embodiment of the present invention. FIG. 8 is a flowchart representing a method for compressing the radio resource pattern sequence according to the exemplary embodiment of the present invention.

As shown in FIG. 7, the pattern sequence compression unit 430 for compressing the radio resource pattern sequence 110 includes a compression length determining unit 431, a compression indicator sequence generator 432, a compressed pattern sequence generator 433, and a compressed radio resource pattern sequence allocation unit 434.

As shown in FIG. 7 and FIG. 8, the compression length determining unit 431 determines a compression unit length, and divides the radio resource pattern sequence into a plurality of compression units in step S210. Here, the compression unit length is determined as a length for minimizing the length of the compressed pattern sequence. The compression indicator sequence generator 432 determines a compression possibility for compressing the plurality of compression units, and expresses the possibility in the compression indicator sequence in step S220. Here, when the plurality of compression units are respectively formed by the same pattern, it is determined that the compression can be performed. When the compression can be performed according to the compression possibility for the plurality of compression units, the compressed pattern sequence generator 433 expresses the compressed sequence (i.e., the same pattern) in the compressed pattern sequence, and expresses the original sequence in the compressed pattern sequence when the compression may not be performed in step S230. The compressed radio resource pattern sequence generator 434 transmits the compressed radio resource pattern sequence in which the compression length, the compression indicator sequence, and the compressed pattern sequence are expressed to the frame transmission unit 440 in step S240.

The above compressed pattern sequence method is not limited to the radio resource pattern sequence according to the exemplary embodiment of the present invention, and it may be applied to a conventional pattern sequence.

The above-described methods and apparatuses are not only realized by the exemplary embodiment of the present invention, but, on the contrary, are intended to be realized by a program for realizing functions corresponding to the configuration of the exemplary embodiment of the present invention or a recording medium for recording the program.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

According to the exemplary embodiment of the present invention, since the resource allocation device informs the terminal of the pattern sequence expressing the radio resources that are differently allocated from a previous one and the resource allocation information based on the pattern sequence, the size of the resource allocation information is reduced, and the location of the radio resource may be informed to the terminal.

In addition, according to the exemplary embodiment of the present invention, the resource allocation device may efficiently compresses the pattern sequence expressing the radio resources that are differently allocated from the previous one, and therefore the size of the resource allocation information may be further reduced.

Further, according to the exemplary embodiment of the present invention, the resource allocation device may inform the terminal of the location of the allocated radio resources regardless of an error of receiving the previous resource allocation information in the terminal.

The invention claimed is:

1. A method for transmitting resource allocation information on a plurality of radio resources to a terminal, the method comprising:
   generating a pattern sequence that includes patterns corresponding to a plurality of radio resources;
   determining a compression unit length and dividing the first pattern sequence into a plurality of compression units based on the compression unit length;
   generating a compression indicator sequence that indicates a compression possibility for each group of the pattern sequence;
   generating a compressed pattern sequence based on the compression indicator sequence;
   generating resource allocation information on the plurality of radio resources, the resource allocation information based on the pattern sequence; and
   transmitting the compression unit length, the compression indicator sequence, the compressed pattern sequence, and the resource allocation information to the terminal,
   wherein the generating of the compressed pattern sequence includes:

when a group can be compressed, expressing a compression pattern for the corresponding group in the compressed pattern sequence; and when a group cannot be compressed, expressing original patterns included in the corresponding group in the compressed pattern sequence.

2. The method of claim 1, wherein in the pattern sequence, a pattern corresponding to a radio resource that is allocated differently from before the resource allocation information is transmitted is different from a pattern corresponding to a radio resource that is allocated the same as before the resource allocation is transmitted.

3. The method of claim 1, wherein the compression unit represents a number of patterns included in a group.

4. The method of claim 1, wherein the determining of the compression unit length comprises determining the compression unit length as a length for minimizing a length of the compression pattern sequence among a predetermined number of lengths.

5. The method of claim 4, wherein the generating of the compression indicator sequence includes:

when a group includes a same pattern, indicating that the compression for the corresponding group can be performed in the compression indicator sequence; and when a group includes a different pattern, indicating that the compression for the corresponding group cannot be performed in the compression indicator sequence.

6. The method of claim 5, wherein the expressing of the compression pattern expresses a pattern included in a group as the compression pattern in the compressed pattern sequence when the group includes the same patterns and compression for the group can be performed.

7. The method of claim 1, wherein the resource allocation information on the radio resource comprises a size of the radio resource and a sum obtained by sequentially adding the sizes.

8. A method for informing a terminal of radio resource allocation by using a pattern sequence including a plurality of radio resources, the method comprising:

determining a compression unit length;

dividing the pattern sequence into a plurality of compression units based on the compression unit length, determining a compression possibility for the plurality of compression units, and expressing the compression possibility in a compression indicator sequence; and expressing a compressed sequence in a compressed pattern sequence when compression can be performed according to the compression possibility, and expressing an original sequence in the compressed pattern sequence when the compression cannot be performed.

* * * * *